Patented Aug. 17, 1954

2,686,800

UNITED STATES PATENT OFFICE 2,686,800

BASIC ALUMINUM PARA-AMINO SALICYLATE AND METHOD OF MAKING

Peter M. Brown, Jr., Livingston, and Stewart M. Beekman, Berkeley Heights, N. J., assignors to Reheis Company, Inc., a corporation of New York No Drawing. Application December 27, 1951, Serial No. 263,700

3 Claims. (Cl. 260—448)

This invention relates to a pharmaceutical product derived from para-amino salicylic acid which is particularly useful in connection with the treatment of tuberculosis.

Para-amino salicylic acid has found extensive use in the last few years in the treatment of tuberculosis but as the acid is bulky and is given in large doses averaging fourteen grams a day, its offensive taste has made administration a serious problem. Added to this is the tendency of the drug to induce gastric distress. Attempts have been made to avoid these difficulties by using the sodium salt of para-amino salicylic acid but the large amount of sodium necessary for an effective dosage may be disadvantageous particularly in the case of cardiac or other like conditions.

We have now discovered that para-amino salicylic acid will react with basic aluminum carbonate under certain conditions to form a basic aluminum salicylate which is a soft odorless off-white powder free from the objectionable characteristics of the acid. The powder is tasteless and when taken orally it hydrolyzes in the weak acid of the stomach to give para-amino salicylic acid and aluminum hydroxide. The liberated acid is free to perform its normal therapeutic function while the aluminum hydroxide tends to react with the stomach acids and so lessens the chance of gastric distress.

In accordance with the present invention we employ a basic aluminum carbonate gel which may be made in accordance with the method described by Harold G. Haynes in the September 7, 1946 issue of The Pharmaceutical Journal. As described therein a 10% aluminum chloride solution is slowly added and rapidly mixed with a 5% excess of a 7% solution of sodium bicarbonate. The resulting gel is filtered through a Büchner funnel, washed with distilled water to remove chlorides and then held under suction for fifteen minutes to remove excess water.

It is customary to define the strength of these gels in terms of aluminum oxide content. A gel may be made with various concentrations of aluminum oxide and although not critical a good working type of gel for our purposes contains approximately 6% to 12% $Al_2O_3$ (assay). Percentages throughout the specification are given as parts by weight unless stated otherwise.

We have found that the basic aluminum carbonate gel may be made to react with an ordinary pharmaceutical grade of para-amino salicylic acid by first mixing it with water in conventional mixing equipment to form a smooth homogeneous slurry. The para-amino salicylic acid is then added and agitation is continued while the basic aluminum carbonate and para-amino salicylic acid react. During this time the pH of the slurry gradually increases and it reaches a constant value when the reaction is completed. The product is immediately filtered and dried in an air circulating drier or under vacuum. This gives a soft, off-white, odorless and tasteless powder which hydrolyzes in weak acid media of a strength commonly found in the stomach. Such a powder may have the empirical formula

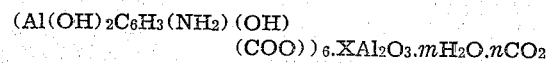

$$(Al(OH)_2C_6H_3(NH_2)(OH)(COO))_6.XAl_2O_3.mH_2O.nCO_2$$

in which "X" will vary depending upon the amount of basic aluminum carbonate gel and para-amino salicylic acid used in the reaction. The value of "m" and "n" will vary with the method used for drying the final product and are not critical.

For our present purpose we prefer to make a final product in which "X" has a value of from 3 to 6 and one in which there is a small amount of carbon dioxide present so that the value of "n" preferably will vary between 0.5 and 3.0. To this end certain conditions should be met in carrying out our invention. First we prefer to keep the amount of aluminum oxide in the initial slurry from 3.5% to 5.5% and preferably between 4% and 5% of the slurry weight calculated before the para-amino salicylic acid is added. The amount of basic aluminum carbonate gel which must be added to a given amount of water to achieve the percentage of aluminum oxide specified may be readily determined from the gel assay which gives its aluminum oxide content. We have found that too much aluminum oxide in the slurry makes it viscous and hard to mix and too little cuts the yield of material because soluble products tend to form which will not filter out of the mother liquor. We have however achieved excellent results within the range specified. The amount of para-amino salicylic acid to be reacted with the gel is of course determined by the amount of aluminum oxide desired in the final product. In general, if the mol ratio of aluminum oxide to the para-amino salicylic acid radical is greater than 1:1 complete neutralization of the organic acid is quickly effected and the formation of a break-down product meta-amino phenol is minimized.

The second consideration involves the reaction and drying temperatures. For best results the reaction is carried out at a temperature below 36° C. and preferably at 30° C. and the resulting product is dried at a temperature ranging between 40° C. and 65° C. and preferably at 45 C. If the reaction or drying temperatures get too high the break-down product meta-amino phenol tends to form which can be harmful if taken internally in any appreciable quantity. At the temperatures specified, the reaction and drying proceed smoothly to give excellent yields and the final product contains approximately 0.5 to 3.0 mols of carbon dioxide.

For the purpose of illustration and in order to point out the best method now known to use of carrying out this invention the following specific examples are given for the preparation of basic aluminum para-amino salicylate.

Example 1

$(Al(OH)_2C_6H_3(OH)(NH_2)(COO))_6.3Al_2O_3.mH_2O.nCO_2$

A homogeneous slurry with a pH of 4.25 containing 4.5% $Al_2O_3$ was formed by mixing 765 grams of basic aluminum carbonate gel (assay 8% $Al_2O_3$) with 595 milliliters of water in conventional blending equipment. 105.5 grams of para-omina salicyclic acid were added and mixing was continued at a temperature of approximately 30° C. for 3 hours and 45 minutes. During this time the slurry pH gradually increased to a constant value of 5.30 and the original bitter taste of the para-amino salicyclic acid disappeared. Agitation was continued for another 15 minutes but the pH remained constant indicating the end point of the reaction. The slurry was immediately filtered and the filter cake was dried for 16 hours at a temperature of approximately 45° C. in an air circulating drier. A yield of 212 grams or 90.6% of the theoretical amount of basic aluminum para-amino salicylate was recovered. On analysis the product was found to contain approximately 26.5% water and 2.2% $CO_2$ corresponding to a value of approximately 25.7 for $m$ and 1.1 for $n$.

Example 2

$(Al(OH)_2C_6H_3(OH)(NH_2)(COO))_6.4Al_2O_3.mH_2O.nCO_2$

The method of Example 1 was repeated as follows:

| | |
|---|---|
| Basic aluminum carbonate gel (assay 8% $Al_2O_3$) _____ g__ | 850 |
| Water _____ ml__ | 750 |
| Para-amino salicylic acid _____ g__ | 102 |
| Initial slurry pH_____ | 4.35 |
| Final slurry pH_____ | 5.40 |
| Mixing time to reach final slurry pH 1 hour 15 min. | |

A yield of 230 grams or 91.0% of the theoretical amount of basic aluminum para-amino salicylate was recovered. An analysis of the dried powder gave 29.6% $Al_2O_3$ and 37.7% para-amino salicylic acid, the water was 30% and the $CO_2$ 2.7%.

Example 3

$(Al(OH)_2C_6H_3(OH)(NH_2)(COO))_6.6Al_2O_3.mH_2O.nCO_2$

The method of Example 1 was again repeated as follows:

| | |
|---|---|
| Basic aluminum carbonate gel (assay 8% $Al_2O_3$) _____ g__ | 850 |
| Water _____ ml__ | 750 |
| Para-amino salicylic acid _____ g__ | 78.2 |
| Initial slurry pH_____ | 4.40 |
| Final slurry pH_____ | 5.45 |
| Mixing time to reach final slurry pH hours | 1 |

A yield of 196 grams or 92.6% of the theoretical amount of basic aluminum para-amino salicylate was recovered.

It will be clearly understood that the examples are intended to give an illustration of the way that the invention may be carried out and are not intended to imply any limitation on the variations that may be employed.

What is claimed is:

1. Basic aluminum para-aminosalicylate containing aluminum atoms in the proportion of at least 2 for 1 para-aminosalicylate radical.

2. In making basic aluminum para-aminosalicylate and minimizing the formation of meta-aminophenol, the method which comprises contacting para-aminosalicylic acid with basic aluminum carbonate in aqueous dispersion and in proportion containing at least 2 atoms of aluminum to 1 mol of the para-aminosalicylic acid and continuing the contact until there is no further substantial reaction 3. The method of claim 2 including drying the resulting product at a temperature not above 65° C.

References Cited in the file of this patent

UNITED STATES PATENTS

| Number | Name | Date |
|---|---|---|
| 1,447,501 | Altwegg | Mar. 6, 1923 |
| 1,967,649 | Wolf | July 24, 1934 |
| 2,480,743 | Krantz et al. | Aug. 30, 1949 |

OTHER REFERENCES

Chem. Ab., vol. 40, page 7300[6] (1948).